July 16, 1929.　　　A. L. STANFORD　　　1,720,801
MANURE SPREADER
Filed Feb. 18, 1927　　　4 Sheets-Sheet 1
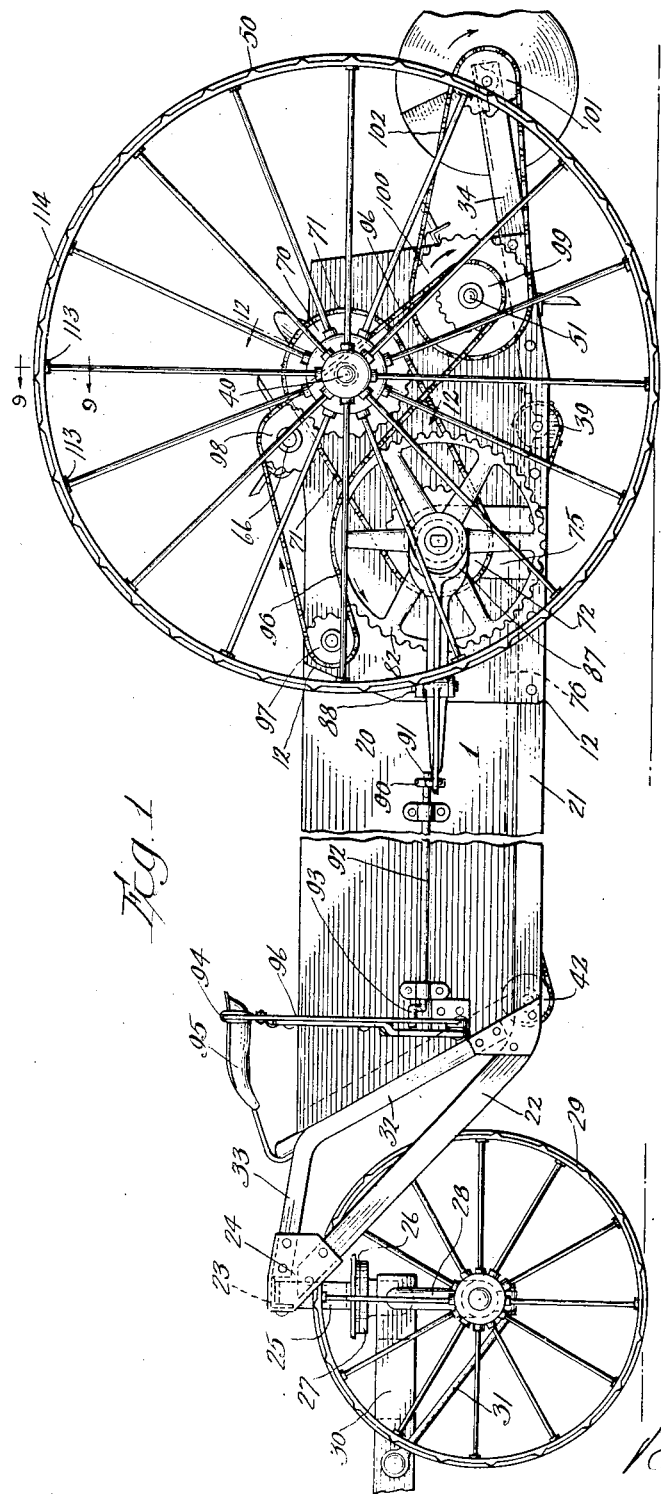
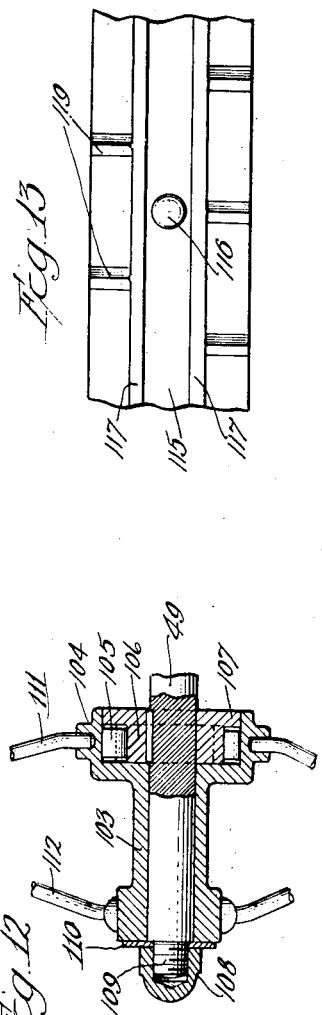
Inventor
Arthur L. Stanford July 16, 1929.   A. L. STANFORD   1,720,801
MANURE SPREADER
Filed Feb. 18, 1927   4 Sheets-Sheet 2
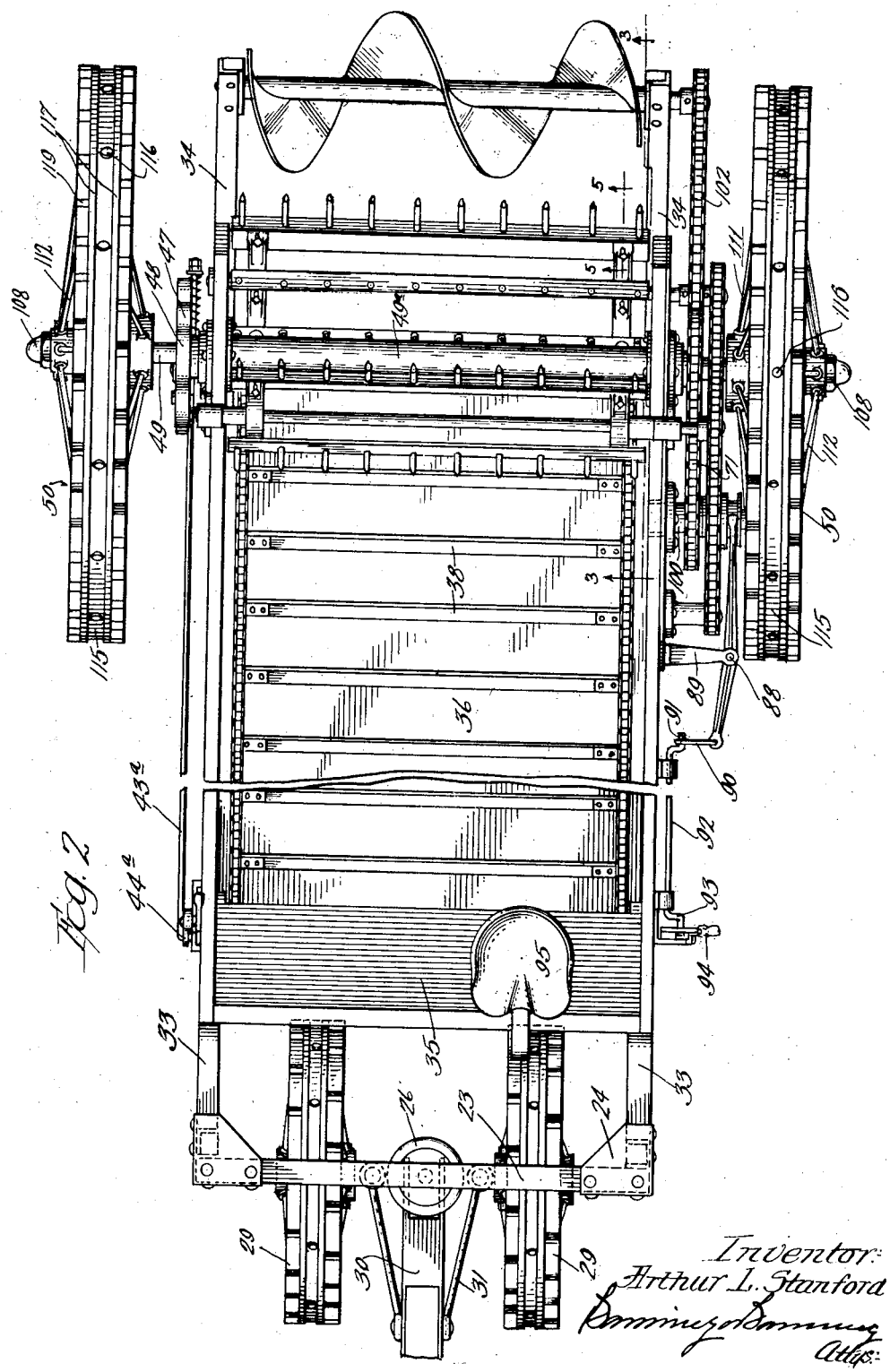

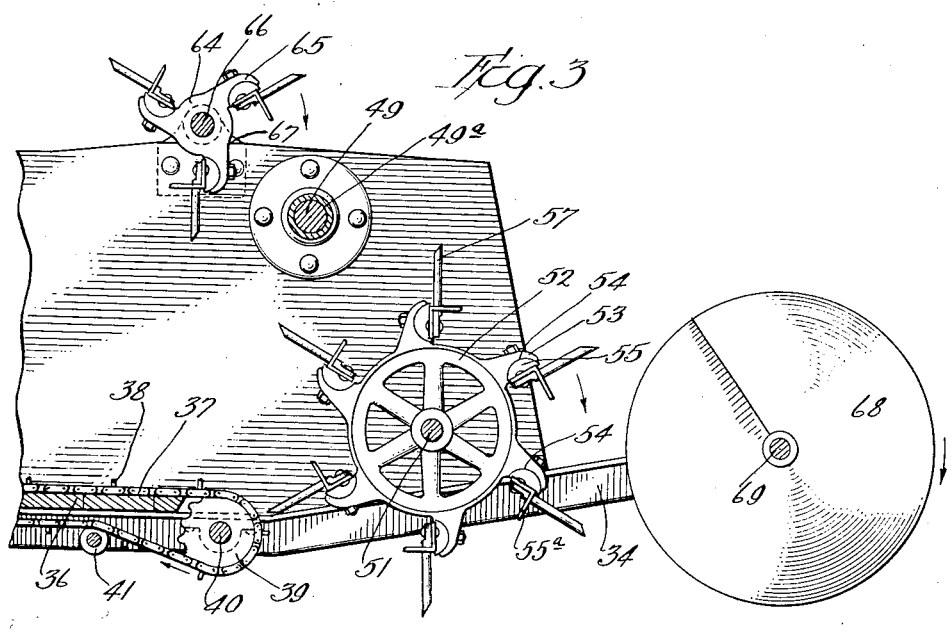
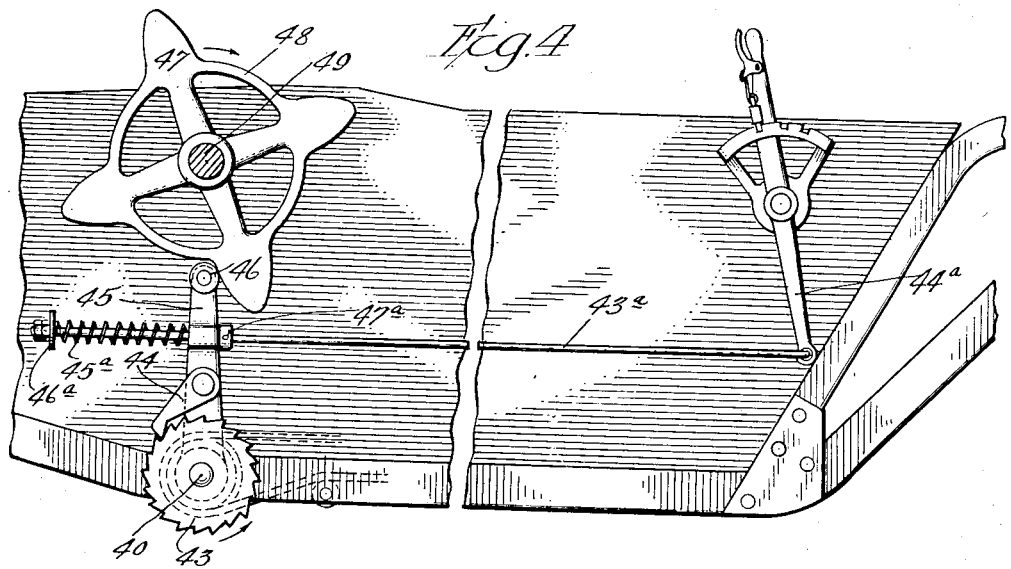

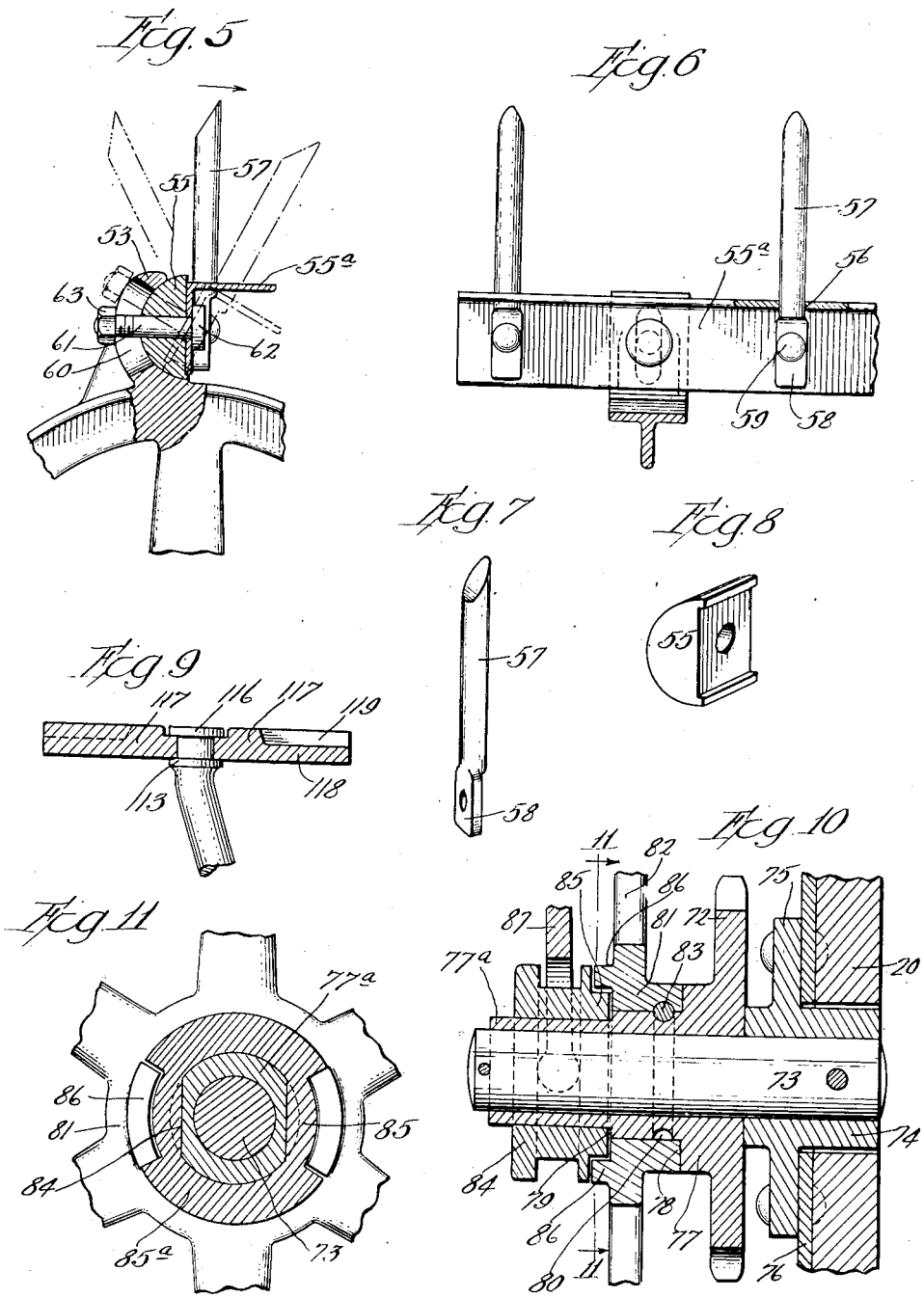

Patented July 16, 1929.

1,720,801

UNITED STATES PATENT OFFICE.

ARTHUR L. STANFORD, OF LIBERTYVILLE, ILLINOIS.

MANURE SPREADER.

Application filed February 18, 1927. Serial No. 169,153.

The manure spreader of the present invention is designed primarily to locate the base or bed of the spreader box at a low level with respect to the ground, so that the labor of loading will be greatly reduced and manure will be discharged by the main beater from a point below the level of the main axle shaft which carries the ground wheel and by the upper beater over the main axle shaft, thereby permitting the main rotary beater to be positioned below the main axle, and slightly to the rear thereof, so that its teeth will sweep upwardly and rearwardly below the main axle and effect the main discharge of the manure from this point. This arrangement permits of the employment of large ground wheels with a consequent ease in the rolling action over the ground surface, and, at the same time, permits the main axle shaft to operate effectively as a power shaft for the transmission of power to the train which rotates both the upper and main beaters and the wide spread spiral. The main axle power shaft also controls the rearward feeding of the endless conveyor for the material.

The arrangement is one which tends to prevent clogging because the beater bars and teeth carried thereby may be rotated backward when handling material which contains much unrotted bedding, fragments of binder twine, etc. The highly important result is that the beater teeth when properly adjusted will clear themselves automatically. Also when compacted material comparatively free from unrotted bedding or the like is handled, the beater bars and teeth may be pitched forward from the radial position, and, as I have demonstrated, the work is greatly facilitated and the power required is reduced to a minimum.

The invention also is directed to clutch and sprocket chain mechanisms and the cam and ratchet devices provided for operating the various mechanisms through power derived from the ground wheels; to the formation of the mounting for the beater teeth and the means provided for adjusting the angularity of the same; to the formation of the treads of the ground wheels to secure adequate ground traction without the sacrifice of continuity in the tread surface, and without the need of separately formed traction cleats. and to the general construction and arrangement of the machine as a whole.

Further objects and details will appear from a description of the invention in conjunction with the accompanying drawings in which—

Figure 1 is a side elevation of the machine as a whole, partly broken away in the center;

Fig. 2 is a top or plan view of the same;

Fig. 3 is a longitudinal sectional elevation through the rear end of the machine showing the beaters, the wide spread rear spiral and the end of the traveling conveyor;

Fig. 4 is a side elevation of a portion of the machine showing the star cam wheel for imparting an intermittent feed to the endless conveyor;

Figs. 5, 6, 7 and 8 are details showing the means for mounting and adjusting the beater teeth;

Fig. 9 is a sectional detail of the ground wheel tread;

Fig. 10 is a sectional elevation through the sprocket and clutch mechanism for distributing power;

Fig. 11 is a sectional detail taken on line 11—11 of Fig. 10;

Fig. 12 is a sectional detail of the hub bearings for the ground wheels; and

Fig. 13 is an enlarged section of the tread surface of one of the ground wheels.

The spreader as a whole comprises a box having side walls 20 which are mounted upon lower side rails 21, the forward ends 22 of which are upwardly diverted and connect with a forward cross rail 23, the union being effected by corner bracket connections 24. The cross rail 23 carries in its center a depending standard 25 terminating in an upper bearing head 26 which co-operates with a lower bearing head 27 in furnishing a mounting for a tongue truck having an arched axle 28 which journals the forward ground wheels 29 and is provided with a forwardly extending tongue 30, suitably braced by side braces 31, the forward arrangement constituting a tongue truck for the support of the forward end of the spreader. The forward edges of the side walls 20 are secured to obliquely disposed angle bars 32, the forward ends 33 of which are diverted forwardly and unite with the corner brackets 23, although these details of construction may be varied as desired.

The rear ends 34 of the side rails 21 protrude beyond the rear end of the box or body of the spreader, and are slightly elevated, as indicated in Fig. 1. The forward end of the box or body is closed by a forward cross wall 35, which is preferably set in oblique relation to furnish a rearwardly sloping surface toward the base of the body.

The spreader is provided with a solid bottom 36, and along each side of the bottom travels the upper turn of an endless chain 37 provided with a plurality of cross angle bars 38, the acting flanges of which extend upwardly and serve to propel the mass rearwardly by intermittent stages. The chains at their rear ends pass around sprockets 39 mounted on a rear shaft 40, and the underturns of the chains pass over idle rollers 41. The forward ends of the chains are carried around sprockets 42 located near the forward end of the floor 36, the arrangement being such that the entire surface of the floor is subjected to the scraping and feeding action of the cross bars 38, which in conjunction with the chains constitute an endless conveyor.

The rear sprocket shaft 40, at one end, carries a ratchet 43 (see Fig. 4), the teeth of which are actuated by a pivoted dog 44 on a swinging arm 45 which is journaled upon the shaft 40, and the swinging arm 45, at its upper end, carries a roller 46 which is recurrently engaged by the teeth 47 of a star wheel 48 mounted upon a shaft 49, which shaft constitutes the axle and main power shaft of the machine and extends across the box or body of the spreader near the upper level thereof, and at a point slightly to the rear of the shaft 40.

The arm 45 has entered through it a draw rod 43ª connected at its forward end to the lower end of a hand lever 44ª and encircled at its rear end by a coil spring 45ª which bears against a plate 46ª. The rod 43ª carries a stop 47ª which bears against the forward edge of the arm 45, the arrangement being such that a rear thrust on the rod 43ª will swing the roller 46 backwardly to the degree required to prevent effective co-action between the dog 44 and the ratchet wheel 43 to stop the movement of the feeding chains of the conveyor.

The shaft 49 passes through a tubular housing 49ª and projects beyond the body at each side, and has mounted thereon the rear ground wheels 50 which are of substantially twice the diameter of the forward ground wheels, and which constitute the source of power for the various operating mechanism. The specific construction of the ground wheels will be hereafter described in detail, since the construction constitutes one of the features of the present invention.

At a distance to the rear of the shaft 40, and somewhat above the level thereof, is located a beater shaft 51 which carries a pair of beater wheels 52, each provided with a plurality of outstanding lugs 53, and each having on its forward edge (in respect to the direction of rotation) a half circular socket recess 54. The two wheels in unison furnish a mounting for a plurality of short semicircular seat blocks 55 (see Fig. 8), which in unison carry angle bars 55ª and fit within the recesses 54, so that the teeth carrying angle bars may be turned so as to throw the beater teeth either forward or backward from their radial position. That is to say, the beater teeth, when in a medial position, will stand in radial relation to the wheels, but the bars may be rocked in either direction, as indicated in Fig. 5, to bring the beater teeth into the desired position.

The beater bars afford a mounting for the beater teeth and the forwardly projecting leg of the angle bar is provided with a plurality of apertures 56 through which the beater teeth 57 are entered. The base 58 of each tooth is flattened and the teeth are rigidly secured to the angle bar by rivets 59 or otherwise.

Each of the lugs 53 is provided with an elongated slot 60 which affords clearance for a bolt 61 provided with a head 62 bearing against the face of the angle plate, and at the rear end of the bolt a nut 63 is provided for holding the bar 55 in adjusted relation. By this means, if desired, the teeth may be adjusted to project forwardly from the radial position, as indicated in dotted lines to the right of Fig. 5, which will afford a more abrupt impingement of the teeth against the mass of manure than if the teeth were adjusted in the medial position, or in the rear position, as indicated in said figure. As shown, the main beater is provided with six rows of teeth, although obviously the number might be varied, if desired.

In addition to the main beater, an upper beater comprising end beater wheels 64 having lugs 65 which carry the teeth in a manner identical with that heretofore described, is provided. The upper beater, as shown, is provided with but three rows of teeth, and the circle of movement of said teeth is more restricted than the circle of movement of the teeth constituting the main beater.

The upper beater is carried by a shaft 66 which is journaled in bearings 67 upon the upper edges of the box or body of the spreader at a point slightly above and forward of the main power shaft 49, and the direction of rotation of the upper beater is the same as that of the lower beater which, however, brings the active teeth into opposition to one another at the point of closest approach, the teeth of the lower beaters sweeping upwardly immediately beneath the main power shaft 49, and the teeth of the upper beater sweeping downwardly from above said shaft. At the extreme rear end of the spreader is located a wide spread spiral 68 which is carried by a shaft 69, the ends of which are journaled upon the rear rail extensions 34, and the spiral is so positioned as to act upon and assist in laterally distributing the mass of manure shredded by the beaters.

The main axle shaft 49 on the left hand side of the machine, looking toward the front, has mounted upon it a main driving sprocket 70 which meshes with a main driving sprocket chain 71 carried around a driven sprocket 72. The driven sprocket 72 and associated parts are best illustrated in Fig. 10, from which it will be noted that the sprocket wheel is freely mounted upon a laterally extending stub shaft 73 rigidly socketed through the bore in a bushing 74, which extends through the side of the body and is integrally formed with a supporting plate 75 which bears against and is bolted to the side plate 76 and rail 21.

The sprocket wheel 72 is provided with a hub 77 and an integral extension stem 77ª which is first shouldered at the point 78 and again shouldered at the point 79 to furnish a stepped formation. The intermediate portion of the hub is provided with a circumferentially extending groove 80, and this portion of the hub journals the hub 81 of a large sprocket wheel 82 which is held against withdrawal from the hub of the small sprocket wheel by the provision of a cross pin 83 which passes through the hub 81 and rests within the groove 80.

The terminal portion of the stepped hub is flattened on two of its faces 84 to afford a mounting for a slidable clutch collar 85 provided with clutch lugs 85ª on its inner face which engage with complementary lugs 86 on the outer face of the hub 81, and the clutch collar is operable by means of a forked lever 87 which is pivoted at the point 88 to a bracket 89 outstanding from the plate 76. The forward end of the lever is engaged by a link 90, which in turn engages the cranked rear end 91 of a rock shaft 92 terminating in a crank 93 which is operable by means of a hand lever 94 in suitable proximity to the driver's seat 95. By operating the handle, the shaft 92 is rocked which operates the forked lever 87 to throw the clutch collar into and out of clutching relation.

The upper portion of the periphery of the large sprocket wheel 82 rides under the lower turn of a sprocket chain 96 which passes around a forward idler sprocket 97 and over an upper sprocket wheel 98 on the end of the shaft 66 which carries the upper beater. The chain also passes around a sprocket wheel 99 on the main beater shaft 51 for driving the main beater, and the shaft 51 also carries a sprocket wheel 100 which co-acts with a sprocket 101 through the medium of a chain 102 for driving the wide spread spiral conveyor.

The formation of the ground wheel 50 includes a hub 103 which is enlarged at its inner end 104 to provide a housing for the usual forward driving dog and ratchet elements 105 which afford engagement with a collar 106 keyed on the left hand end of the main power shaft, which collar is shielded on its inner side by a flange 107 lying within the enlarged inner portion of the hub. The hub of the wheel is held against displacement by a hub cap 108 screwed on the reduced end 109 of the shaft, a washer 110 being interposed beneath the hub cap. The driving wheels are substantially identical and work together to rotate the main axle drive shaft 49 when the machine is advancing.

Each of the ground wheels is provided with inner and outer spokes 111 and 112, respectively, which converge toward their outer ends. The spokes are upset to provide shoulders 113 which bear against the inner face of the wheel rim and are riveted against the outer face of the rim. The central portion 115 of the rim is of slightly channeled formation as indicated, but is unbroken by cross cleats or the like so as to afford continuity of rolling surface, the channeling being to afford a space for the riveting down of the heads 116 of the spokes, which arrangement provides circumferentially extending ribs 117.

The ribs afford the continuous rolling surface for the wheel, and the margin portions of the rim 118 are of reduced thickness, as indicated in Fig. 9, save at recurrent intervals where beveled cross lugs 119 are provided which extend outwardly to the edge of the wheel and lie in staggered relation to one another on opposite sides of the wheel rim, as indicated in Fig. 13. The arrangement is one which affords adequate ground traction under all conditions, and, at the same time, permits the wheels to travel on a paved road without injury to the road and without the shocking or jarring motion commonly incident to the use of cross cleats of the ordinary character.

In operation, with the spreader loaded with manure and the ratchet feeding mechanism in action, the slow rearward travel of the feeding chains with the cross bars carried thereby will gradually work the load toward the rear. With the clutch collar 84 thrown into clutching relation with the sprocket hub 81, the rotation transmitted through the ratchet and chain connections from the main axle drive shaft will be imparted to the large ratchet wheel 82 which rotates the lower and upper beaters in the same direction with respect to one another, and, at the same time, through the sprocket connections provided rotates the wide spread spiral at the rear of the machine. This causes the teeth of both beaters to sweep upwardly and rearwardly, so that the entire mass from the bottom up will be subjected to the shredding and feeding action of the teeth, which may be adjusted to the desired angle to best subserve the intended operation.

The material drawn off and shredded by the teeth of the large beater will be carried upwardly and rearwardly by the teeth under the main axle shaft, where it unites with the backwardly flowing stream of material thrown over the main power axle shaft by the upper beater, and the material in shredded and disintegrated form will be discharged from the spreader at a point near the ground where it will be laterally diverted and spread out by the action of the wide spread spiral in an even and uniform layer over the ground surface.

The sprocket chain drive for the beaters remains constantly in mesh, the clutch collar being relied upon to maintain or interrupt the power transmission, as the case may be, which affords a driving arrangement much superior to that commonly employed in which the sprocket chain itself is lifted out of mesh when it is desired to interrupt the transmission train. The upper beater is in position to clear away the material and throw the same over the axle, reducing the load down to a point just below the axle, so that the remainder of the load may pass under the axle and be delivered to the large beater.

By the employment of large ground wheels, it is possible to elevate the main power shaft sufficiently to feed the manure back above and below the shaft which permits the employment of a straight shaft extending completely across the machine, and permits the entire rear body of the spreader, with the load carried thereby, to be suspended from a high point, thereby affording a rugged and highly desirable method for mounting and carrying the spreader, and by locating the spreader box at a low level, the loading of the same will be much facilitated under all conditions. The mountings for the beater bars are of a character which permit a complete set of teeth to be adjusted en banc by tilting the tooth carrying bars to the desired angle, and this adjustability is highly desirable in dealing with material of varying consistency, since it permits the teeth to sweep through the mass at an angle best suited to perform the intended operation. The tubular housing for the main power shaft not only encloses the shaft, but subserves the function of a tie rod in reinforcing the walls of the box body against the effects of side thrust and permits the arch commonly employed for a like purpose to be dispensed with.

I claim:

1. In a manure spreader, the combination of a box, a main power shaft extending transversely of the box near the rear end thereof, ground wheels associated with the main power shaft and adapted to impart rotation thereto, a beater shaft located below the main power shaft and carrying teeth rotatable to sweep upwardly and rearwardly beneath the main power shaft in the discharge of material between the shaft and the beater, and driving connections from the main power shaft to the beater, substantially as described.

2. In a manure spreader, the combination of a box, a main power shaft extending transversely of the box near the rear end thereof, ground wheels associated with the main power shaft and adapted to impart rotation thereto, a beater shaft located below the main power shaft and carrying teeth positioned to sweep beneath the main power shaft in the discharge of material, driving connections from the main power shaft to the beater, an upper beater shaft located above the main power shaft and provided with teeth positioned to discharge material over the main power shaft, and driving connections from the main power shaft to the upper beater, substantially as described.

3. In a manure spreader, the combination of a box, a main power shaft extending transversely of the box near the rear end thereof, ground wheels mounted upon the ends of the main power shaft and adapted to impart rotation thereto, a beater shaft located below the main power shaft and carrying teeth positioned to sweep beneath the main power shaft in the discharge of material, driving connections from the main power shaft to the beater, an upper beater shaft located above the main power shaft and provided with teeth positioned to discharge material over the main power shaft, and driving connections from the main power shaft to the upper beater, substantially as described.

4. In a manure spreader, the combination of a box, a main power shaft extending transversely of the box near the rear end thereof, ground wheels associated with the main power shaft and adapted to impart rotation thereto, a beater shaft located below and to the rear of the main power shaft and carrying teeth positioned to sweep beneath the main power shaft in the discharge of material, driving connections from the main power shaft to the beater, an upper shaft located above and forwardly of the main power shaft and provided with teeth positioned to discharge material over the main power shaft, and driving connections from the main power shaft to the upper beater, substantially as described.

5. In a manure spreader, the combination of a box, a main power shaft extending transversely of the box near the rear end thereof, ground wheels mounted upon the ends of the main power shaft and adapted to impart rotation thereto, a beater shaft located below and to the rear of the main power shaft and carrying teeth positioned to sweep beneath the main power shaft in the discharge of material, driving connections from the main power shaft to the beater, an upper beater shaft located above and forwardly of the main power shaft and provided with teeth positioned to discharge material over the main power shaft, and driving connections from the main power shaft to the upper beater, substantially as described.

6. In a manure spreader, the combination of a box, a main power shaft extending transversely of the box near the rear end thereof, ground wheels associated with the main power shaft and adapted to impart rotation thereto, a beater shaft located below the main power shaft and carrying teeth positioned to sweep beneath the main power shaft in the discharge of material, driving connections from the main power shaft to the beater, an upper beater shaft located above the main power shaft and provided with teeth positioned to discharge material over the main power shaft, driving connections from the main power shaft to the upper beater, and a traveling conveyor carried in the bottom of the box and having its plane of feeding movement elevated above the bottom of the orbit of movement described by the teeth of the main beater, substantially as described.

7. In a manure spreader, the combination of a box, a main power shaft extending transversely of the box near the rear end thereof, ground wheels mounted upon the ends of the main power shaft and adapted to impart rotation thereto, a beater shaft located below the main power shaft and carrying teeth positioned to sweep beneath the main power shaft in the discharge of material, driving connections from the main power shaft to the beater, an upper beater shaft located above the main power shaft and provided with teeth positioned to discharge material over the main power shaft, driving connections from the main power shaft to the upper beater, and a traveling conveyor carried in the bottom of the box and having its plane of feeding movement elevated above the bottom of the orbit of movement described by the teeth of the main beater, substantially as described.

8. In a manure spreader, the combination of a box, a main power shaft extending transversely of the box near the rear end thereof, ground wheels associated with the main power shaft and adapted to impart rotation thereto, a beater shaft located below and to the rear of the main power shaft and carrying teeth positioned to sweep beneath the main power shaft in the discharge of material, driving connections from the main power shaft to the beater, an upper shaft located above and forwardly of the main power shaft and provided with teeth positioned to discharge material over the main power shaft, driving connections from the main power shaft to the upper beater, and a traveling conveyor carried in the bottom of the box and having its plane of feeding movement described by the teeth of the main beater, substantially as described.

9. In a manure spreader, the combination of a box, a main power shaft extending transversely of the box near the rear end thereof, ground wheels mounted upon the ends of the main power shaft and adapted to impart rotation thereto, a beater shaft located below and to the rear of the main power shaft and carrying teeth positioned to sweep beneath the main power shaft in the discharge of material, driving connections from the main power shaft to the beater, an upper beater shaft located above and forwardly of the main power shaft and provided with teeth positioned to discharge material over the main power shaft, driving connections from the main power shaft to the upper beater, and a traveling conveyor carried in the bottom of the box and having its plane of feeding movement elevated above the bottom of the orbit of movement described by the teeth of the main beater, substantially as described.

10. In a manure spreader, the combination of a box, a main power shaft extending transversely through the box near the rear thereof and in elevated relation with respect to the bottom of the box, a main beater shaft located below and to the rear of the main power shaft and extending transversely of the box, beater teeth carried by the main beater shaft, an upper beater shaft located above and forwardly of the main power shaft and extending transversely of the box, beater teeth carried by the upper beater shaft, the three shafts lying substantially in the same plane, a traveling conveyor for discharging material to the teeth of the main beater shaft, ground wheels, and transmission connections from the main power shaft for driving the several mechanisms through power derived from the ground wheels, substantially as described.

11. In a manure spreader, the combination of a box, driving ground wheels associated therewith, a main beater shaft journaled transversely of and near the rear end of the box, and beater teeth carried thereby, a sprocket on the end of the main beater shaft, an upper shaft journaled transversely of the box and beater teeth carried thereby, a sprocket carried on the end of the upper beater shaft, an idler sprocket in advance of both beater shafts, a main transmission sprocket wheel having the upper turn of its periphery located in intermediate relation between the main beater sprocket and the idler sprocket, a sprocket chain passing around the main beater sprocket and around the idler sprocket and having its upper turn carried over and around the upper beater sprocket and having its lower turn carried over and around the main transmission sprocket wheel, a driving connection between the main transmission sprocket wheel and one of the ground wheels, and clutch mechanism associated with the main transmission sprocket wheel for clutching and unclutching the driving connection, substantially as described.

12. In a manure spreader, the combination of a box, driving ground wheels associated therewith, a main beater shaft journaled transversely of and near the rear end of the box, and beater teeth carried thereby, a sprocket on the end of the main beater shaft, an upper shaft journaled transversely of the box and beater teeth carried thereby, a sprocket carried on the end of the upper beater shaft, an idler sprocket in advance of both beater shafts, a main transmission sprocket wheel having the upper turn of its periphery located in intermediate relation between the main beater sprocket and the idler sprocket, a sprocket chain passing around the main beater sprocket and around the idler sprocket and having its upper turn carried over and around the upper beater sprocket and having its lower turn carried over and around the main transmission sprocket wheel, a driving connection between the main transmission sprocket wheel and one of the ground wheels, and clutch mechanism for clutching and unclutching the driving connection, substantially as described.

13. In a manure spreader, the combination of a box, driving ground wheels associated therewith, a main beater shaft journaled transversely of and near the rear end of the box and beater teeth carried thereby, a sprocket on the end of the main beater shaft, an upper shaft journaled transversely of the box and beater teeth carried thereby, a sprocket carried on the end of the upper beater shaft, an idler sprocket in advance of both beater shafts, a main transmission sprocket wheel having the upper turn of its periphery located in intermediate relation between the main beater sprocket and the idler sprocket, a sprocket chain passing around the main beater sprocket and around the idler sprocket and having its upper turn carried over and around the upper beater sprocket and having its lower turn carried over and around the main transmission sprocket wheel, a driving connection between the main transmission sprocket and one of the ground wheels, and clutch mechanism associated with the main transmission sprocket wheel for clutching and unclutching the driving connection, said clutch mechanism including a slidable collar in continuous engagement with the driving connection for the main transmission sprocket wheel, co-acting clutching elements on the collar and on the main transmission sprocket wheel respectively, and hand operated means for shifting the clutch collar, substantially as described.

14. In a manure spreader, the combination of a box, a main power shaft axle extending transversely of the box near the rear end and in elevated relation with respect to the floor of the box, ground wheels carried by and having driving connection with the main power shaft axle, a traveling conveyor mounted on the floor of the box, dog and ratchet connections for progressively moving the feeding surface of the conveyor rearwardly, a main beater shaft located below and to the rear of the main power shaft, an upper beater shaft located above the main power shaft and forwardly thereof, beater teeth carried by the respective beater shafts, a main transmission sprocket wheel located below and in advance of the main power shaft, a stud axle on which the main transmission sprocket wheel is carried, a chain and sprocket transmission train between the main power shaft and the main transmission sprocket wheel, clutch connections for throwing the transmission train into clutched relation with the main transmission sprocket wheel, a chain and sprocket train of connections between the main transmission sprocket wheel and the respective beater shafts, and driving connections between the main power shaft and the dog and ratchet conveyor feeding mechanism, substantially as described.

15. In a manure spreader, the combination of a beater shaft, radially arranged teeth supporting members mounted thereon and provided with radially protruding lugs having rounded socket portions, teeth carrying members mounted within said socket portions and adjustable therein to vary the angularity of the teeth, and teeth carried by said members, said socket portions being provided with elongated slots, and adjusting members carried by the teeth carrying members and entered through said slots and adapted to maintain the teeth carrying members in adjusted relation to vary the angularity of the teeth, substantially as described.

16. In a manure spreader, the combination of a beater shaft, teeth supporting protruding members extending radially of said shaft and provided with socket portions, teeth carrying members adjustably mounted within said socket portions and teeth carried thereby, and means for permitting adjustment of said teeth carrying portions to vary the angularity of the teeth, substantially as described.

17. In a manure spreader, the combination of a beater shaft, a plurality of teeth carrying wheels on the beater shaft each provided with radially protruding lugs having rounded socket portions on its periphery, blocks rounded in part to rock within said socket recesses, teeth carrying bars abutting against and carried by said socketed blocks, teeth secured to said bars, and means associated with said rounded blocks and said sockets for permitting adjustment and holding said blocks in adjusted relation within said sockets, substantially as described.

18. In a manure spreader, the combination of a beater shaft, a plurality of teeth carrying wheels on the beater shaft each provided with rounded socket portions on its periphery, blocks rounded in part to rock within said socket recesses, teeth carrying bars abutting against and carried by said socketed blocks, teeth secured to said bars, a bolt entered through each of said blocks, the associated socket portions being provided with elongated slots through which said bolts are also entered, and a nut on the end of each bolt for holding the associated block in adjusted relation to permit variation in the angularity of the teeth, substantially as described.

ARTHUR L. STANFORD.